United States Patent [19]
Niedrach

[11] 3,714,015
[45] Jan. 30, 1973

[54] SENSOR WITH ION EXCHANGE RESIN ELECTROLYTE

[75] Inventor: Leonard W. Niedrach, Schenectady, N.Y.

[73] Assignee: General Electric Company

[22] Filed: Sept. 4, 1970

[21] Appl. No.: 69,650

[52] U.S. Cl. ............................204/195 P, 117/232
[51] Int. Cl. ..............................................G01n 27/46
[58] Field of Search .....136/86 R, 86 F; 204/1 T, 195

[56] References Cited

UNITED STATES PATENTS

| | | | |
|---|---|---|---|
| 3,134,697 | 5/1964 | Niedrach | 136/86 F |
| 3,278,408 | 10/1966 | Leonard et al. | 204/195 |
| 3,382,105 | 5/1968 | McBryar et al. | 136/86 F |
| 3,415,730 | 12/1968 | Haddad | 204/195 |

Primary Examiner—T. Tung
Attorney—Richard R. Brainard, Paul A. Frank, Charles T. Watts, Paul R. Webb, II, Frank L. Neuhauser, Oscar B. Waddell, Joseph B. Forman and John F. Akern

[57] ABSTRACT

A sensor has an elongated flexible current collector, an electrochemically active region in electrical contact with a portion of the current collector, a second elongated flexible current collector surrounding the first current collector, a second electrochemically active region in electrical contact with a portion of the second current collector, a first layer of electrical insulation disposed between the first and second current collectors, a second layer of electrical insulation disposed over the second current collector, an ion exchange resin electrolyte contacting both electrochemically active regions, and an outer sheath of diffusion barrier material encapsulating at least the electrochemically active regions and the electrolyte. Methods of manufacturing sensors including polarographic oxygen sensors are also described.

6 Claims, 4 Drawing Figures

PATENTED JAN 30 1973 3,714,015

Inventor:
Leonard W. Niedrach,
by Paul R. Webb, II
His Attorney.

SENSOR WITH ION EXCHANGE RESIN ELECTROLYTE

This invention relates to sensors and to methods of manufacturing such sensors and, more particularly, to polarographic oxygen sensors employing an ion exchange resin electrolyte and to methods of manufacturing these sensors by a series of immersion or application coating steps.

Sensors are employed to determine the content of a specific substance in a fluid or atmosphere. For example, a sensor might be employed to determine the content of oxygen, or carbon dioxide in a sample, or its pH.

Polarographic oxygen sensors are known in the prior art for determining oxygen content of a sample. In operation, such a sensor determines the transfer rate of oxygen through a diffusion barrier by measuring the related limiting reduction current at a polarized electrode. U.S. Patent describing such sensors include No. 2,913,386 — Clark issued Nov. 17, 1959 for "Electrochemical Device for Chemical Analysis," No. 3,415,730 — Haddad issued Dec. 10, 1968 for "Flexible Electrode Assembly" and No. 3,449,231 — Adams et al. issued June 10, 1969, for "Oxygen Sensor with Rhodium Cathode."

It is desirable to provide sensors which are rugged but flexible and accurate and can be miniaturized. Further, it is advantageous to provide a method of manufacturing such sensors which is inexpensive and simple.

My present invention is directed to an improved sensor which is suitable for biomedical application and to a method of manufacturing such a sensor through an immersion or application coating process.

The primary objects of my invention are to provide a rugged, dependable miniaturized sensor and an improved method of manufacturing the sensor.

In accordance with one aspect of my invention, a sensor comprises a first elongated flexible current collector, an electrochemically active region in electrical contact with a portion of the current collector, a second elongated flexible current collector surrounding at least partially the first current collector, a second electrochemically active region in electrical contact with a portion of the second current collector, a first layer of electrical insulation disposed between said first and second current collectors, a second layer of electrical insulation disposed over the second current collector, an ion exchange resin electrolyte contacting both electrochemically active regions, and an outer sheath of diffusion barrier material encapsulating the electrochemically active regions and the electrolyte.

These and various other objects, features and advantages of the invention will be better understood from the following description taken in connection with the accompanying drawing in which.

Figure 1:
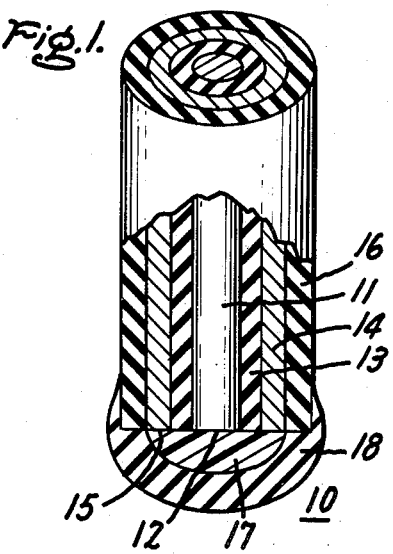
FIG. 1 is a sectional view of a portion of a polarographic oxygen sensor made in accordance with my invention.

In FIG. 1 of the drawing, there is shown generally at 10 a portion of a sensor embodying my invention. Sensor 10 is shown with a first elongated flexible current collector 11 in the form of a 20-mil palladium wire with an electrochemically active region 12 of hydrided palladium with a surface coating of platinum black in electrical contact with the lower end portion thereof. This electrochemically active region 12 provides the counter electrode or anode. A first layer of electrical insulation 13 in the form of Alkanex polyester resin lacquer surrounds current collector 11 but electrode 12 is exposed. A second elongated current collector 14 of silver paint surrounds at least partially the first current collector 11 whereby electrical insulation 13 is disposed between current collectors 11 and 14. Current collector 14 can be in a variety of configurations including a stripe, wire, etc. Such current collectors surround at least partially the first current collector. A second electrochemically active region 15 consists of the exposed cross-section of the silver painted current collector 14. This electrochemically active region 15 provides the sensing electrode or cathode 15. An ion exchange resin electrolyte 17 of quaternized polystyrene in its phosphate form contacts both electrochemically active regions 12 and 15, respectively, by bridging first polymer electrical insulation 13. Second layer of electrical insulation 16 of Alkanex lacquer is disposed over second current collector 14. A diffusion barrier material of Viton hexafluoropropylene-vinylidene fluoride rubber encapsulates as an outer sheath 18 the electrochemically active regions 12 and 15, and electrolyte 17. If desired, material 18 can also surround current collector 14 in lieu of insulation 16. The resulting device is a polarographic oxygen sensor.

Figure 2:
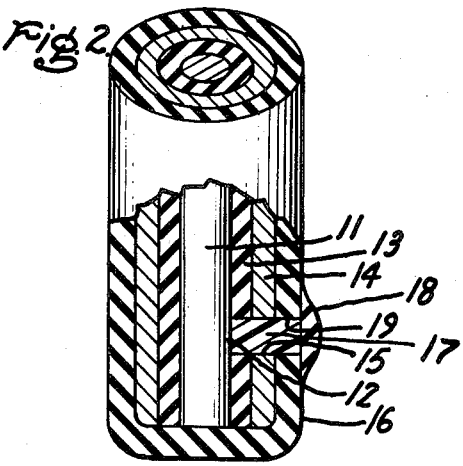
FIG. 2 is a sectional view of a portion of a modified sensor.

In FIG. 2 of the drawing, there is shown a portion of a modified polarographic oxygen sensor wherein current collector 11 of 20-mil thick palladium and current collector 14 of silver paint have first layer of insulation 13 of Alkanex polyester resin lacquer disposed therebetween. Second layer of electrical insulation 16 is disposed over current collector 14 and the lower end portion of the device. At least one continuous opening 19 extends outwardly from an exposed, non-insulated portion on current collector 11 through insulation 13, current collector 14 and insulation 16. First electrochemically active region 12 of hydrided palladium with a surface coating of platinum black is in electrical contact with a portion of current collector 11 at the exposed portion thereof. Second electrochemically active region 15 consists of the exposed cross section of the silver painted current collector 14. Ion exchange resin electrolyte 17 of quaternized polystyrene in its phosphate form contacts both electrochemically active regions 12 and 15, respectively, by bridging first polymer electrical insulation 13. An outer sheath of diffusion barrier material 18 of Viton hexafluoropropylene-vinylidene fluoride rubber encapsulates electro-chemically active regions 12 and 15, and electrolyte 17.

Figure 3:
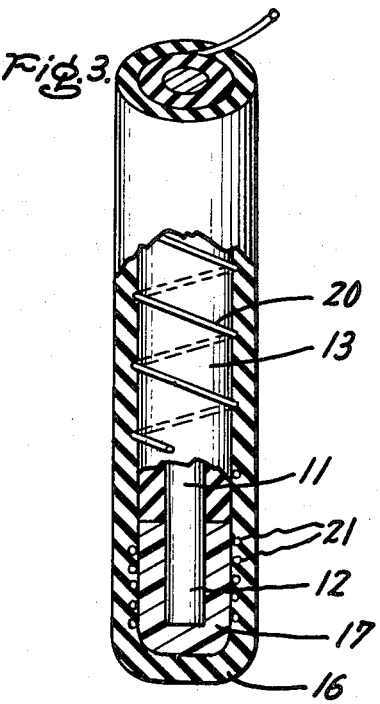
FIG. 3 is a sectional view of a portion of another modified sensor.

In FIG. 3 of the drawing, there is shown a portion of a further modified polarographic oxygen sensor wherein the first layer of electrical insulation 13 is a polyphenylene oxide polymer which is disposed between first current collector 11 of 20-mil thick platinum wire and second current collector 20 which is the form of a spiral platinum wire. The first electrochemically active region 12 is antimony containing antimony surface oxide in electrical contact with the lower portion of current collector 11. Additionally, electrically conductive material of graphite was added to active region 12. The second electrochemically active region 21 in the form of a closer spiral platinum wire is in electrical contact with second current collector 20 by being a continuation thereof. Ion exchange resin 17 of sulfonated polyphenylene oxide contacts both electrochemically active regions 12 and 21. The second layer of electrical insulation 16 is disposed over second current collector 20 and is of a diffusion barrier material of non-sulfonated polyphenylene oxide which encapsulates also the electrochemically active regions 12 and 21, and electrolyte 17.

Figure 4:
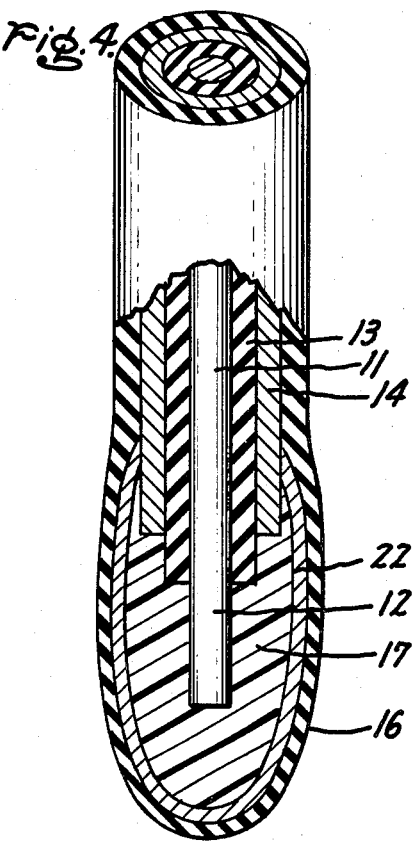
FIG. 4 is a sectional view of a portion of a further modified sensor.

In FIG. 4 of the drawing, there is shown a portion of a further modified polarographic oxygen sensor wherein first layer of insulation 13 of Alkanex polyester resin lacquer is disposed between first current collector 11 of 20 mil thick palladium wire and second current collector 14 of gold paint. First electrochemically active region 12 of hydrided palladium with a surface coating of platinum black is in electrical contact with the lower portion of current collector 11. Second electrochemically active region 22 in the form of a layer of silver paint is in electrical contact with second current collector 14. Ion exchange resin 17 of quaternized polystyrene in its phosphate form contacts both electrochemically active regions 12 and 22. Second layer of electrical insulation 16 is disposed over second current collector 14 and is of a diffusion barrier material of Viton hexafluoropropylene-vinylidene fluoride rubber which encapsulates also the electrochemically active regions 12 and 22, and electrolyte 17.

I found that I could form improved sensors, and particularly, the above described polarographic oxygen sensors by a unique method of applying successive elements from various organic solutions after which each solution solvent was evaporated. The application of the successive layers is preferably accomplished by an immersion step but other suitable means include coating, spraying, brushing, etc.

I found that my unique method of forming a sensor produces a rugged flexible structure which method employs an initial wire support upon which the other successive layers are applied. I found further that various elements of these sensors can employ a variety of materials.

A method of forming is now described with particular application to producing polarographic oxygen sensors. Generally, these polarographic oxygen sensors are divided into two types. The first type employs a cation exchange resin electrolyte preferably in the form of a strong acid while the second type employs an anion exchange resin electrolyte, preferably in a buffered, neutral form or in the form of a strong base. For the initial support wire forming the current collector, a noble metal such as palladium or platinum is preferred but other non-corrodible metals can be used. Both types of sensors can be made in similar steps.

Suitable first electrochemically active regions which have been employed for the counter electrode or anode include antimony with antimony surface oxide for the acid type sensor, and hydrided palladium with a surface coating of platinum black for the basic, neutral and acidic type sensor. Suitable second electrochemically active regions which have been employed for the sensing electrode or cathode include platinum, rhodium and iridium for the acidic type sensor, and platinum, rhodium, iridium, gold and silver for the basic and neutral type sensor. It will, of course, be appreciated that various other electrochemically active regions can be employed.

I found that various electrical insulating materials are useable and many of such materials can be applied by coating steps. Preferred materials include Viton hexafluoropropylene-vinylidene fluoride rubber, Alkanex polyester resin lacquer, silicone rubbers, and polypropylene oxides. I prefer to employ Alkanex polyester resin lacquer which provides the desired electrical insulation and which can be applied by coating or dipping in accordance with my method. The Alkanex polyester resin lacquer can be cross-linked by heating to insolubilize and thereby facilitate the application of successive layers. I found that various diffusion barrier materials are suitable as an outer sheath to encapsulate at least the electrochemically active regions and the electrolyte. The diffusion barrier material must be electrically insulating and have an appropriate permeability coefficient for the particular substance, such as oxygen, to be sensed. Since these materials are electrically insulating, the diffusion barrier sheath and the second layer of insulation can be made of one of these materials. Thus, the separate second layer of electrical insulation can be eliminated. Suitable materials which have been employed include polypropylene oxide, Viton hexafluoropropylene-vinylidene fluoride rubber, Adiprene urethane rubber and silicone rubbers.

I found that an ion exchange resin can be employed as the electrolyte in my sensor and can be applied by coating in accordance with my method. Various exchange membrane materials are known. For example, reference is made to such preparation and properties of a number of different types of such resins in U.S. Pat. No. 3,134,697 entitled "Fuel Cell" which issued in my name and is assigned to the same assignee as the present application.

I found that sulfonated polyphenylene oxide, sulfonated poly(2,6-diphenyl-phenylene oxide) and sulfonated capped poly(2,6-diphenyl-phenylene oxide) in the acid form were suitable electrolytes for the cation exchange resin type sensor. With the anion exchange resin type sensor, I found that suitable electrolytes included a terpolymer of methyl methacrylate, divinylbenzene and 2-hydroxy-3-trimethylammonium propyl methacrylate in the hydroxide or in the phosphate buffer form, and quaternized polystyrene in the hydroxyl or in a phosphate buffer form. Of the anion exchange resin electrolyte, I preferred the quaternized polystyrene in a phosphate buffer form. The preference for this electrolyte is based upon its lesser degree of swelling.

A quaternized polystyrene is a polystyrene which is partially converted to a quaternary amine derivative. The manufacture of this electrolyte involves the chloromethylation and subsequent quaternization of polystyrene as shown in Equation (1).

Equation (1)

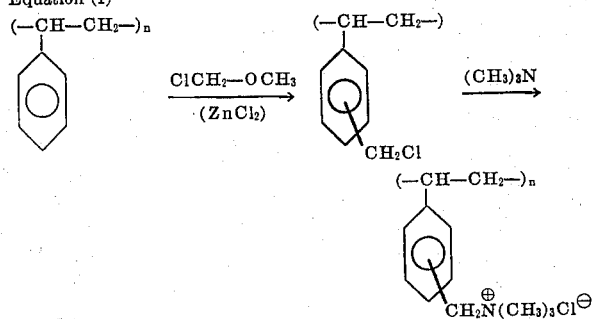

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain optimal values which correspond to chlorine contents of 3.6–4.2 percent for the chloromethylated but not quaternized resin, about 1 chloromethyl group for every 8 repeat units. Polystyrene is generally chloromethylated in chloromethylmethylether as the alkylating agent with zinc chloride as a catalyst, without use of a solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No cross-linking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20 percent water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation (2).

Equation (2)

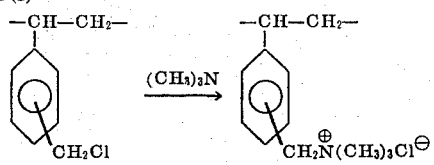

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20 percent solution in dioxane. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40°–50° C. in Vacuo.

I found that I could form a sensor and particularly an oxygen sensor by a unique method of applying successive elements from various organic solutions after which each solution solvent was evaporated. The application of the successive layers is preferably accomplished by a series of immersion or application coating steps.

With reference to FIG. 1 of the drawing a polarographic oxygen sensor is formed in accordance with the unique method of my invention by employing a 20-mil palladium wire 11 as the base or support upon which the successive elements are applied. This wire is the first elongated flexible current collector 11 of the sensor. The wire has its central portion immersed in a solution of Alkanex polyester resin lacquer to apply a first layer of electrical insulation 13 on current collector 11. It will be appreciated, of course, that a tube of insulation could be applied over the central portion of the current collector by slipping the tube over the collector. Opposite ends of wire 11 are exposed and not coated by insulation 13. A first electrochemically active region 12 is placed in electrical contact with current collector 11 by roughening one exposed end of the current collector by sand blasting and then applying lightly platinum black by electrocoating. The opposite exposed end (not shown) is provided for subsequently applying an electrical lead thereto.

A second elongated flexible current collector 14 of silver is applied to surround the first current collector 11 by painting the silver thereon. Second active region 15 is the exposed cross section of the silver painted current collector 14. A second layer of electrical insulation 16 is then applied over second current collector 14 except for a small region at the upper end for subsequently applying an electrical lead thereto. I prefer to employ Alkanex polyester resin lacquer for this purpose. The lower end of the coated structure with electrochemically active regions 12 and 15 is immersed in a solution of quaternized polystyrene in the chloride form thereby forming ion exchange resin electrolyte 17. Electrolyte 17 is in contact with both regions 12 and 15.

Electrolyte 17 is converted to a phosphate buffer form and the first electrically active region 12 is charged. I have found that this particular electrolyte in its phosphate buffer form provides the most desirable results when employed as an oxygen sensor. The sensor except for its second layer of insulation and diffusion barrier membrane is immersed in a dilute phosphate buffer at pH 7. After the ion exchange electrolyte has been equilibrated for a period of 30 to 60 minutes, a current generally of about 0.1 milliampere for about 16 hours is forced between the active region 12 and an auxiliary platinum electrode that is immersed in the same buffer solution. The device is then rinsed briefly in water and partially dried in a flowing gas which provides 10 percent hydrogen in a nitrogen atmosphere. A diffusion barrier of Viton rubber is then applied as an outer sheath 18 encapsulating the electrically active regions 12 and 15, and electrolyte 12.

The resulting polarographic oxygen sensor can be inserted in the interior of a catheter for insertion within a body cavity or used for clinical analysis. An appropriate low value resistance with an ammeter in series is connected to the respective electrodes. The electrical output from the sensor in operation will be a linear function of the oxygen partial pressure of the environment.

With reference to FIG. 2, a modified polarographic oxygen sensor can be formed in similar manner to and with the same materials of the sensor of FIG. 1 by applying successive elements. The steps described above are followed to provide current collector 11, first layer of insulation 13 thereon, and second current collector 14. The adjacent end portions of collectors 11 and 14 are not coated with their respective electrochemically active regions as described above for FIG. 1. The structure is immersed into a solution of Alkanex polyester resin lacquer to provide second layer of insulation 16.

At least one opening 19 is then provided through insulation layer 13, current collector 14, and insulation layer 16. It will of course be appreciated that more than one opening can be provided and that the opening can be in various configurations such as at least a portion of a spiral. A first electrochemically active region 12 is applied to the exposed portion of current collector 11, and the second electrochemically active region 15 is the exposed cross section of the silver painted current collector 14. The opening 19 is filled with electrolyte 17. Electrolyte 17 is converted to a phosphate buffer form and the first electrically active region 12 is charged as in the above description in FIG. 1. An outer sheath 18 of Viton rubber encapsulates electrolyte 17 and the electrochemically active regions 12 and 15. The resulting sensor can be employed in the same manner as the sensor of FIG. 1.

With reference to FIG. 3, a modified polarographic oxygen sensor can be formed in a generally similar manner and with similar or different materials to the sensors of FIGS. 1 and 2. Current collector 11 in the form of a 20-mil platinum wire 11 has its central portion immersed in a solution of polyphenylene oxide dissolved in an organic solvent such as chloroform. After immersion of wire 11 in the solution and removal therefrom, the solvent evaporates at about 50° C. to provide a first layer of electrical insulation 13 on current collector 11. Opposite ends of wire 11 are exposed and not coated by insulation 13. A first electrochemically active region 12 is placed in electrical contact with current collector 11 by immersing one exposed end of the current collector in a suspension of antimony containing surface oxide and graphite in sulfonated polyphenylene oxide dissolved in a mixed organic solvent consisting of chloroform and methanol. After the one end of the current collector is removed from the suspension the solvent evaporates at the above temperature to produce an antimony with antimony surface oxide, the first electrically active region 12, in electrical contact with the end of the current collector 11. The opposite exposed end (not shown) is provided for subsequently applying an electrical lead thereto. Active region 12 has then applied an ion exchange resin 17 of sulfonated polyphenylene by immersing region 12 in a sulfonated polyphenylene oxide solution. Current collector 20 is applied in the form of a platinum wire in spiral fashion around insulation 13. Second electrochemically active region 21 is in the form of a closer spiral of the same platinum wire surrounding and in contact with electrolyte 17. After the second electrochemically active region 21 has been applied, it is frequently desirable to dip the lower end of the structure into the above solution of electrolyte to provide further a good bond of active region 21 to electrolyte 17. Second layer of insulation 16 is applied from a solution including an organic solvent of chloroform over current collector 20 and is of a diffusion barrier material of polyphenylene oxide which encapsulates also as an outer sheath the electrochemically active region 12 and 21, and electrolyte 17. The electrolyte is then hydrated, for example, by equilibration with water. The resulting oxygen sensor can be employed in the same manner as the sensors in FIGS. 1 and 2.

With reference to FIG. 4 of the drawing, a further modified oxygen sensor can be formed in a similar fashion to the sensors of FIGS. 1–3. In this modified sensor, I prefer to employ a 20-mil palladium wire as current collector 11 for the base or support upon which the successive elements are applied. Current collector 11 is immersed in a solution of an insulating polymer of Alkanex polyester resin lacquer except for about 1 centimeter at each end. A second current collector 14 of gold is then applied over the insulation 13 by painting thereon. One exposed end of collector 11 is roughened by sand blasting and platinum black is applied lightly thereto by electrocoating to form first electrochemically active region 12. Active region 12 is immersed in a solution of quaternized polystyrene to form electrolyte 17. Second active region 22 is formed and connected electrically to second current collector 14 by applying silver paint employing the quaternized polystyrene as a binder over electrolyte 17 and in contact with current collector 14. The preferred method of applying the silver is to form a mixture of finely divided silver and electrolyte solution from which the silver is coated on the electrolyte and in contact with the edge of the current collector.

Electrolyte 17 is converted to a phosphate buffer form and the first electrically active region 12 is charged. I have found that this particular electrolyte in its phosphate buffer form provides the most desirable results when employed as an oxygen sensor. The sensor except for its second layer of insulation and diffusion barrier membrane is immersed in a dilute phosphate buffer at pH 7. After the ion exchange electrolyte has been equilibrated for a period of 30 to 60 minutes, a current generally of about 0.1 milliampere for about 16 hours is forced between the active region 12 and an auxiliary platinum electrode immersed in the same buffer solution. The device is then rinsed briefly in water and partially dried in a flowing gas which provides 10 percent hydrogen in a nitrogen atmosphere.

A second layer of electrical insulation 16 is then applied over second current collector 14. I prefer to employ Viton hexafluoropropylene-vinylidene fluoride rubber since this is a diffusion barrier material with electrical insulation properties. The device is completely covered with the Viton hexafluoropropylene-vinylidene fluoride rubber whereby in addition to a layer being formed over current collector 14, a diffusion barrier as an outer sheath 18 also encapsulates the electrically active region 12 and 22, and electrolyte 17. The resulting oxygen sensor can be employed in the same manner as the sensors in FIGS. 1–3.

Examples of polarographic oxygen sensors made in accordance with my invention are as follows:

EXAMPLE 1

A plurality of polarographic oxygen sensors were formed in accordance with the above description and in the form of FIG. 3 of the drawing. The current collector was in the form of a 20-mil palladium wire which was immersed in a solution of Alkanex polyester resin lacquer except for about 1 centimeter at each end. The coated wire was heated at a temperature of 100° C. to evaporate the solvent and then to 200° C. to crosslink the coating. This coating step was repeated several times. One exposed end of the current collector was then roughened by sand blasting and platinum black was then applied by being electrocoated lightly thereon to provide the first electrochemically active region. The first region had then applied thereon an ion exchange resin electrolyte consisting of a terpolymer of methyl methacrylate, divinylbenzene, and 2-hydroxy-3-trimethylammonium, propyl methacrylate in the chloride form having an ion exchange capacity of about 0.7 milliequivalents per gram. The electrolyte layer was applied by immersing the coated structure in a solution of the resin in a mixture of chloroform-methanol to cover and coat the first active region. The solvent covered completely the first active region and overlapped the first layer of insulation for a short distance. The second current collector was applied in the form of a silver wire in spiral fashion around the first insulation. The second electrochemically active region was in the form of a closer spiral of the same wire surrounding and in contact with the electrolyte. After the second electrochemically active region had been applied, the lower end of the structure was immersed into the above solution of electrolyte and solvent removed to provide further a good bond of the second active region to the electrolyte.

The electrolyte was converted to a phosphate form and the first electrically active region was charged. The conversion of the electrolyte and the charging of the first active region was accomplished by immersing the structure in a dilute phosphate buffer at pH 7. After the ion exchange electrolyte had been equilibrated for a period of 30 to 60 minutes, a current of 0.1 milliampere was forced between the first active region and an auxiliary platinum electrode immersed in the same buffer solution for a period of about 16 hours. The structure was then rinsed briefly in water and partially dried in a flowing gas of 10 percent hydrogen in a nitrogen atmosphere.

A second layer of electrical insulation was then applied over the second current collector by immersing the structure in a solution of Viton hexafluoropropylene-vinylidene fluoride rubber. This material is both a diffusion barrier material and has electrical insulation properties. The structure was covered with the Viton rubber whereby in addition to a layer being formed over the second current collector a diffusion barrier also encapsulated both of the electrically active regions and the electrolyte. The resulting structure was a polarographic oxygen sensor.

EXAMPLE 2

A plurality of polarographic oxygen sensors were formed in accordance with the above description, Example 1 and in the form of FIG. 3 of the drawing. However, the electrolyte was a quaternized polystyrene, in a phosphate buffer form having an ion exchange capacity of 0.7–1.4 milliequivalents per gram. The resulting structure was a polarographic oxygen sensor.

EXAMPLE 3

A plurality of polarographic oxygen sensors were formed in accordance with the above description and in the form of FIG. 4 of the drawing. 20-mil palladium wire was employed as the current collector which was insulated with Alkanex lacquer except for about 1 centimeter at each end. The second current collector of gold was then applied over the insulation by painting thereon. One exposed end of the first current collector was roughened by sand blasting and platinum black was applied lightly thereto by electrocoating to form first electrochemically active region 12. The first active region was immersed in a chloroform-methanol solution of quaternized polystyrene in the chloride form having an ion exchange capacity of 0.7–1.4 milliequivalents per gram to form electrolyte thereon. The solvent was evaporated as described above. The second active region 22 was formed and connected electrically to the second current collector by applying silver paint over electrolyte 17 and in contact with current collector 14. The silver was applied from a mixture of finely divided silver and electrolyte solution. The solvent was eliminated as above described.

The electrolyte was converted to a phosphate form and the first electrically active region was charged. The conversion of the electrolyte and the charging of the first active region was accomplished by immersing the structure in a dilute phosphate buffer at pH 7. After the ion exchange electrolyte had been equilibrated for a period of 30 to 60 minutes, a current of 0.1 milliampere was forced between the first active region and an auxiliary platinum electrode immersed in the same buffer solution for a period of about 16 hours. The structure was then rinsed briefly in water and partially dried in a flowing gas of 10 percent hydrogen in a nitrogen atmosphere.

A second layer of electrical insulation was then applied over the second current collector by immersing the structure in a solution of Viton hexafluoropropylene-vinylidene fluoride rubber. This material is both a diffusion barrier material and has electrical insulation properties. The structure was covered with the Viton rubber whereby in addition to a layer being formed over the second current collector a diffusion barrier also encapsulated both of the electrically active regions and the electrolyte. The resulting structure was a polarographic oxygen sensor.

EXAMPLE 4

The polarographic oxygen sensors made in accordance with Example 1 above were tested by being immersed under water in separate one-half inch diameter cylindrical gas containers which were fused onto porous fritted discs. Streams of oxygen gas through the discs kept the water saturated with oxygen. The containers for the sensors which were immersed in a water bath were maintained at 37° C. The time constant for the desired sensor response was less than 1 minute. Such time constant is defined as for 63 percent realization of the total response. The electrical output was about 20–40 nanoamperes per millimeter of oxygen.

These sensors were operated overnight at 37° C. at a steady resistive load using 15 percent oxygen in the supply gas. The temperature coefficient was 4–5 percent per degree centigrade which measurements were made with the sensors immersed in the oxygenated water.

EXAMPLE 5

The oxygen sensors made in accordance with Example 2 were tested as above described in Example 4. The time constant for the desired sensor response was less than 1 minute. The temperature coefficient was 4–5 percent per degree centigrade. The electrical output was about 20–40 nanoamperes per millimeter of oxygen.

EXAMPLE 6

The polarographic oxygen sensors made in accordance with Example 3 were tested as above described in Example 1. The time constant for the desired sensor response was less than 1 minute. The temperature coefficient was 4–5 percent per degree centigrade. The electrical output was about 20–40 nanoamperes per millimeter of oxygen.

While other modifications of the invention and variations thereof which may be employed within the scope of the invention have not been described, the invention is intended to include such as may be embraced within the following claims.

What I claim as new and desire to secure by Letters Patent of the United States is:

1. A sensor comprising a first elongated flexible current collector, an electrochemically active region in electrical contact with a portion of the current collector, a second elongated flexible current collector surrounding at least partially the first current collector, a second electrochemically active region in electrical contact with a portion of the second current collector, a first layer of electrical insulation disposed between the first and second current collectors, a second layer of electrical insulation disposed over the second current collector, an ion exchange resin electrolyte contacting both electrochemically active regions, and an outer sheath of diffusion barrier material encapsulating at least the electrochemically active regions and the electrolyte.

2. In a polarographic oxygen sensor as in claim 1, in which the outer sheath is an oxygen diffusion barrier material.

3. In a polarographic oxygen sensor as in claim 1, in which the first current collector is a palladium wire, the first electrochemically active region is hydrided palladium with a surface coating of platinum black, the second current collector is gold, the second electrochemically active region is silver, the electrolyte is quaternized polystyrene in its phosphate form, the first insulation is polyester resin lacquer, and the second insulation and diffusion barrier are hexafluoropropylene-vinylidene fluoride rubber.

4. In a polarographic oxygen sensor as in claim 1, in which the second electrochemically active region is in the form of a wire spiral and the wire spiral surrounds a portion of the electrolyte.

5. In a polarographic oxygen sensor as in claim 1, in which at least one continuous opening extends outwardly from an exposed, non-insulated portion on the first current collector through the first insulation, second current collector and second insulation, the first active region is in electrical contact with the exposed portion on the first current collector, the second active region is in electrical contact with the second current collector at said continuous opening, and the electrolyte fills the opening thereby contacting both active regions.

6. In a polarographic oxygen sensor as in claim 5, in which the opening is in the form of at least a portion of a spiral.

* * * * *